Patented June 6, 1933

1,913,227

UNITED STATES PATENT OFFICE

MARTIN BANDLI, OF LONDON, ENGLAND, ASSIGNOR OF ONE-HALF TO THE LEATHER CLOTH COMPANY, LIMITED, OF LONDON, ENGLAND, A BRITISH COMPANY

PROCESS OF INCORPORATING RUBBER WITH CELLULOSE DERIVATIVES

No Drawing. Application filed December 22, 1931, Serial No. 582,671, and in Great Britain December 20, 1930.

This invention relates to the manufacture of leather and rubber substitutes produced by incorporating rubber into cellulose derivatives such as, for instance, cellulose nitrate and cellulose acetate.

According to this invention, a rubber solution is mixed with a plastic, more or less viscous mass prepared by precipitating a cellulose derivative from a solution of it containing at least one plasticizer either in suspension or dissolved and capable of being precipitated together with the cellulose derivative, by adding to the solution a precipitating liquid which is miscible with the solvent (or at least one of the solvents if more than one is used) of the cellulose derivative.

The precipitate of cellulose derivative and plasticizer and any other softening or like agent which may have been added is obtained in the form of a more or less viscous paste which contains in very fine distribution a small quantity of a liquid composed partly of the precipitating agent and partly of the solvent or solvents, used for making the cellulose solution.

To facilitate the mixture of the rubber with the cellulose paste and to ensure or enhance the coherence of the product, the rubber may be dissolved in a solvent or a mixture of solvents which is miscible either with the precipitating agent used for precipitating the cellulose derivative or with a mixture of the precipitating agent and the solvent or solvents used in making up the cellulose solution.

The cellulose solution from which the cellulose derivative is precipitated may contain a natural or synthetic resin or one or more binding or dispersing agents which are miscible with or soluble in the precipitating agent used for precipitating the cellulose derivative or with a mixture of the precipitating agent and the solvent or solvents used in making up the solution of cellulose derivative.

Without confining the invention to one or more of these binding or dispersing agents the following have been found suitable: dextrin, glucose, grape-sugar, cellulose ethers, glues of animal, vegetable or synthetic origin, gelatin, agar-agar, alkali silicate, drying or non-drying oils, glycerine or its derivatives, sulphonated oils or fatty acids.

Water is used generally as the precipitating agent but other liquids may be used as long as they are substantially non-solvents for the cellulose derivative and the plasticizer and as long as they conform with the requirements as to miscibility defined above.

The plasticizers which are precipitated together with the cellulose derivative may be, for instance, tricresyl phosphate, particularly in the case of cellulose nitrate and triacetin and the esters of phenols or poly-phenols, particularly in the case of cellulose acetate. Non-solvent softening mediums may be added. It is advantageous that the plasticizer should be a solvent of the cellulose derivative and should be one of the solvents in the mixture which is non-miscible with the precipitating liquid.

The products made by the invention may be vulcanized.

The following examples illustrate the invention, the parts being by weight:—

(1) 150 parts of wet nitro-cotton are dissolved in a mixture of 500 parts of acetone, 500 parts of methylated spirit and 500 parts of ether. 70 parts of tricresyl phosphate and 100 parts of castor oil are added. After thorough stirring, the whole is allowed to stand for some hours and then stirred while water is added until precipitation has occurred. The precipitate is removed from the liquid and transferred to a kneading machine in which it is mixed with a solution of 50 parts of rubber in 250 parts of benzene, to which have been added 5 parts of bone glue.

(2) 200 parts of wet nitro-cellulose are dissolved in 1000 parts of acetone and there are added 52 parts of tricresyl phosphate, 24 parts of castor oil and 1 part of carbon black. The precipitation of the solution and the mixing of the precipitated rubber are conducted as described in the first example.

Having thus fully described and ascertained the nature of the said invention and the best means I know of carrying the same into practical effect, what I claim is:—

A process of making a substitute for rubber or leather, comprising dissolving a cellulose derivative in a solvent therefor, adding a plasticizer and a dispersing agent, adding to said mixture a liquid miscible with said solvent and dispersing agent and capable of precipitating the cellulose derivative and plasticizer and kneading the precipitate while in a viscous state with rubber dissolved in a solvent therefor.

In testimony whereof I have signed my name to this specification.

MARTIN BANDLI.